April 22, 1952     H. Z. GORA     2,593,667
METHOD AND APPARATUS FOR MOLDING PLASTIC ARTICLES
Filed Aug. 19, 1948     4 Sheets-Sheet 1

INVENTOR.
Henry Z. Gora
BY
Johnson and Kline
ATTORNEYS

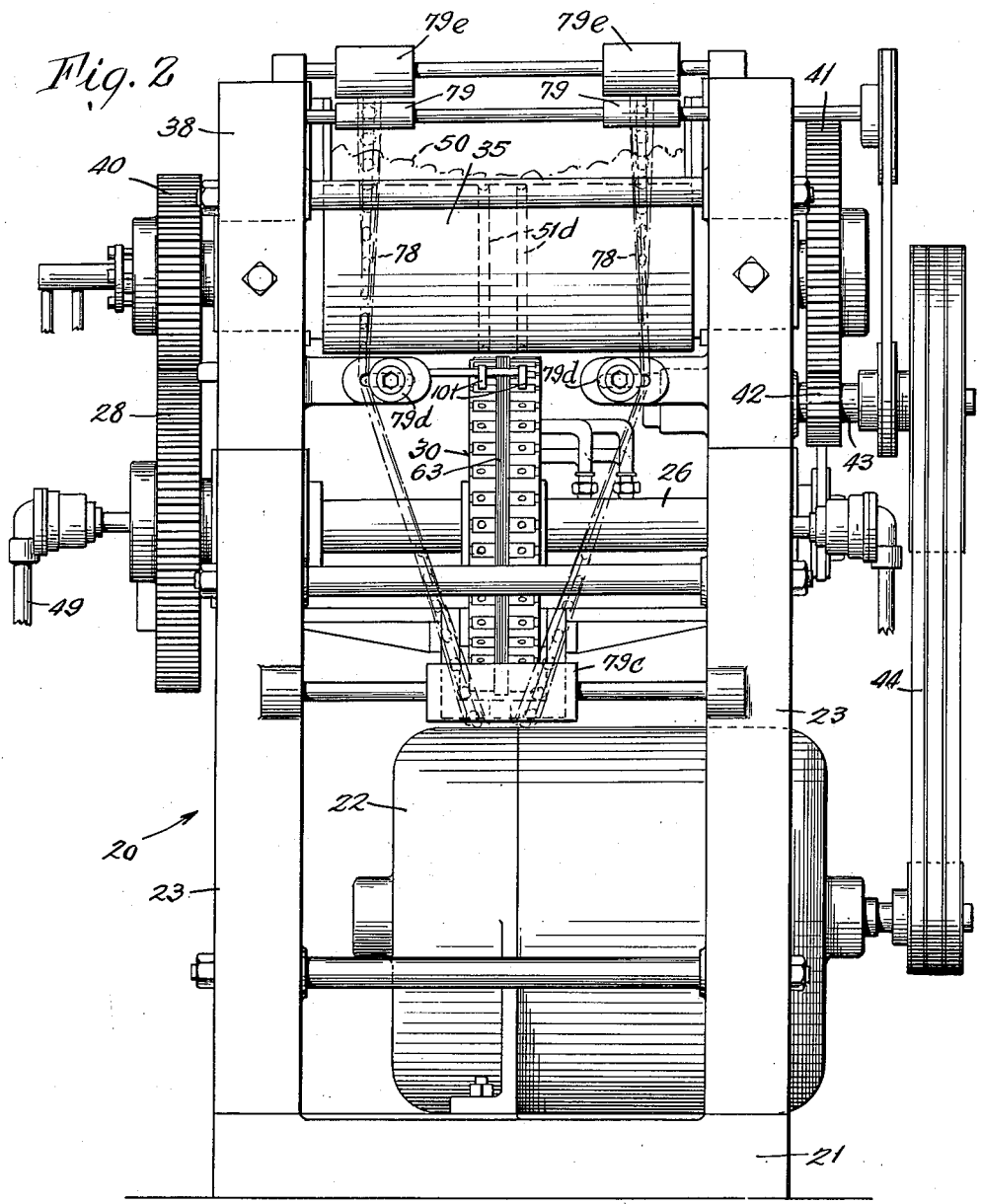

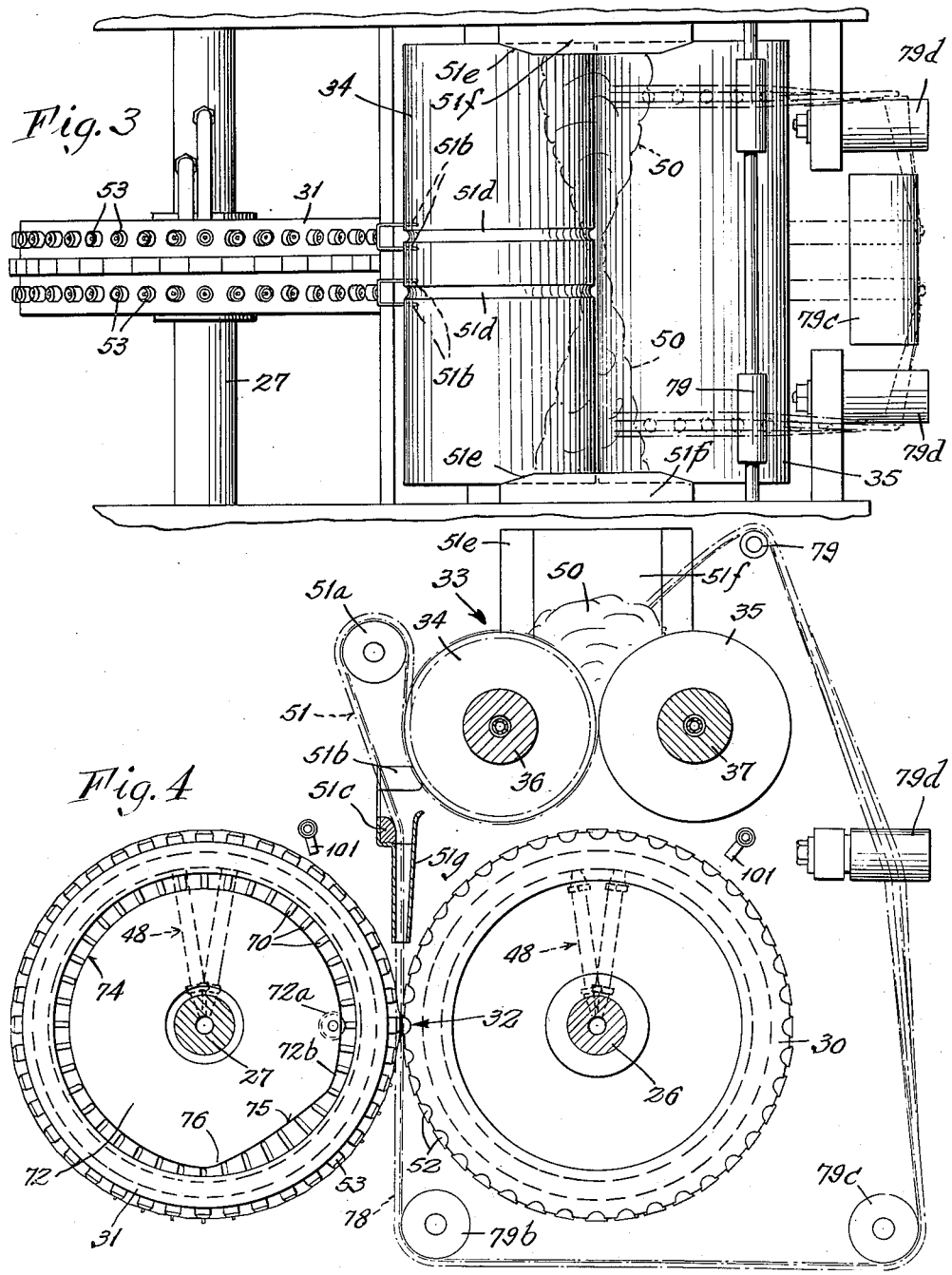

April 22, 1952  H. Z. GORA  2,593,667
METHOD AND APPARATUS FOR MOLDING PLASTIC ARTICLES
Filed Aug. 19, 1948  4 Sheets-Sheet 4

INVENTOR.
Henry Z. Gora
BY
Johnson and Kline
ATTORNEYS

Patented Apr. 22, 1952

2,593,667

UNITED STATES PATENT OFFICE 2,593,667

METHOD AND APPARATUS FOR MOLDING PLASTIC ARTICLES

Henry Z. Gora, Stratford, Conn., assignor to The Gora-Lee Corporation, Stratford, Conn., a corporation of Connecticut Application August 19, 1948, Serial No. 45,190

6 Claims. (Cl. 18—2)

This invention relates to the manufacture of articles from thermoplastic material, and particularly to the molding of such relatively small articles as various types of buttons, washers, caps, etc. from such a suitable thermoplastic material or other elastomer, although it will be apparent from the following description that the invention is not limited to manufacturing any specific product from any particular plastic material.

The present invention is another embodiment of that shown in my co-pending application, Serial No. 642,193, filed January 19, 1946, now United States Patent No. 2,548,306, issued April 10, 1951, in which a strip of plastic moldable material is fed between cooperating die members located on the peripheries of rotating, die-supporting drums, whereby material from the strip is blanked out and pressed between the dies as the drums rotate to form the desired product, the molded pieces being thereafter ejected from the die members. If the plastic material is such as to require curing, or vulcanizing, as in the case of rubber or other elastomer, the molded pieces can be ejected onto a conveyor belt or the like and carried thereon through any suitable vulcanizing oven or other curing apparatus. As described in said application, the material is plasticized by being worked between a pair of mill rolls to which the prepared raw material is fed in bulk to form the bank in the rollers. After sufficient working to produce the desired degree of plasticity and a layer of desired thickness is formed on one roller, a band or strip of molding material is cut from that roller at the delivery end, fed to and between the die members on the rotating drums, and the skeletonized strip then returned to the raw material in the plasticizing mill to be reworked and reincorporated in the bulk raw material. As described in said application, the band or strip which is passed between the die members and from which the molded articles are formed, is a flat strip of substantially uniform cross-section.

An object of the present invention is to provide an improved method and apparatus for molding articles from thermoplastic materials.

When it is attempted to remove at high speed a plurality of strips from the plasticizing mill rolls, as is described for example in the said co-pending application, difficulty is usually experienced in obtaining separate strips of satisfactory form and cross-section, as the strip which is formed nearest to the bulk material in the mill tends to starve the strip formed further away from such material and prevents sufficient material reaching the point at which the other strip or strips are formed to produce entirely satisfactory results.

A further object of this invention is to provide a method and apparatus for plasticing material capable of producing at high speed a plurality of satisfactory separate strips of moldable material from a single mill.

These and other objects which will be apparent are accomplished by the invention hereinafter described, and illustrated in the accompanying drawings in which—

Figure 2 is a side elevation of the machine shown in Figure 1;

Fig. 3 is a top plan view of a part of the machine shown in Fig. 2 and illustrating the plastising mill rolls;

Fig. 4 is a sectional view showing the complete process;

Figure 1:
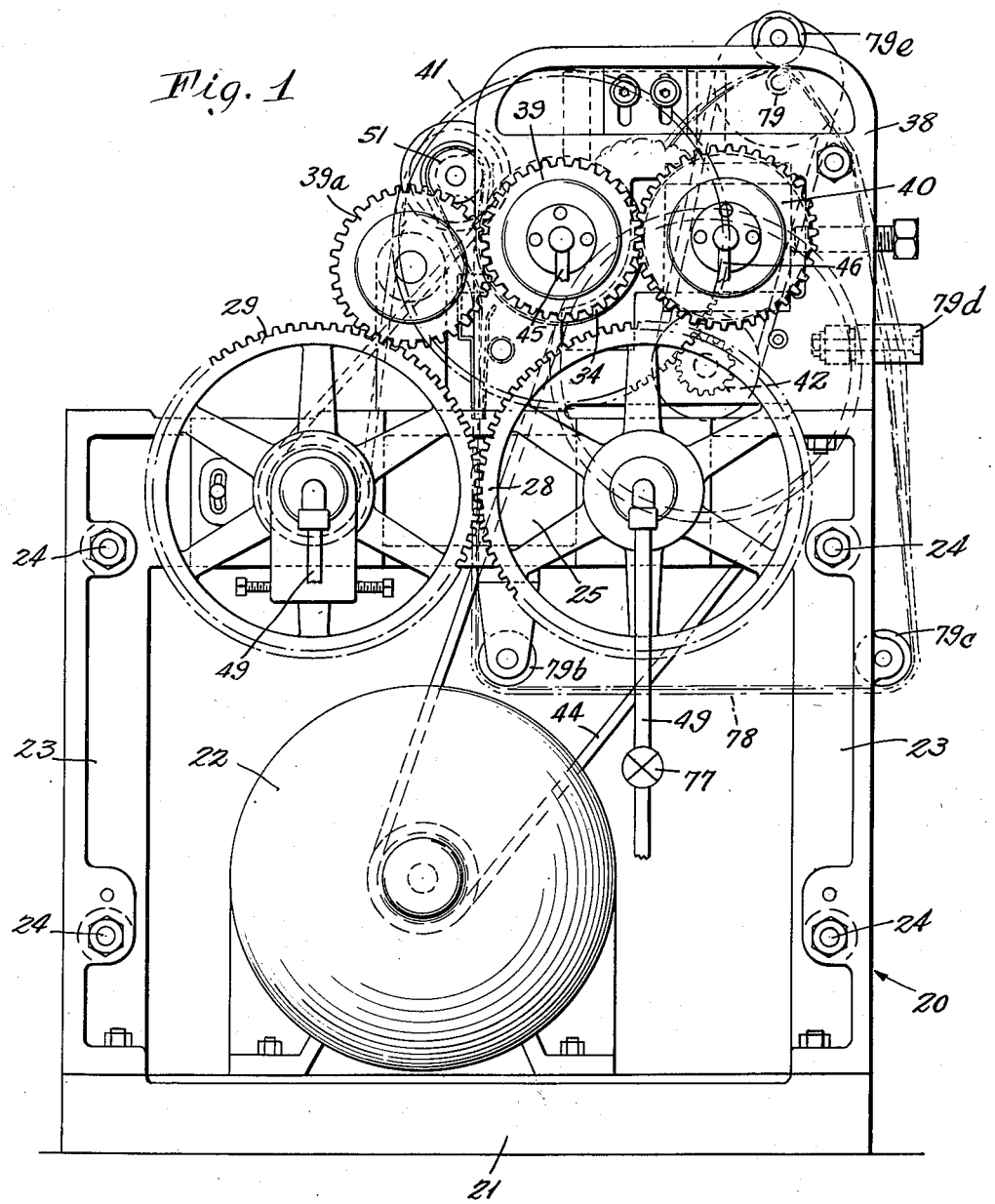
Figure 1 is an end elevation of a continuous molding machine constructed in accordance with one embodiment of this invention.

The illustrated embodiment of the invention includes a machine comprising a frame 20 on a base 21 supporting an electric motor 22, uprights 23 secured in position by tie rods 24, and horizontal members 25 in which are journaled shafts 26 and 27 having meshing spur gears 28 and 29.

The shaft 26 carries a rotary drum or die carrier 30, Fig. 3, and the shaft 27 carries a drum or die carrier 31. The drums 30 and 31 have substantially the same diameter, and are located on parallel axes with their peripheries extending closely adjacent at a point 32 which constitutes a molding station.

Above the drums 30 there is a warming mill 33 including heat-controlled rolls 34 and 35 mounted on shafts 36 and 37 respectively, journaled in vertical extensions 38 of the frame 20. The rolls 34 and 35 are geared together by smaller and larger spur gears 39 and 40 mounted on the shafts 36 and 37 respectively, so that the roll 34 rotates faster than the roll 35. The shaft 36 also has a spur gear 41 mounted thereon, Figs. 1 and 2, engaging a pinion 42 carried by a jack shaft 43 which is driven through a belt and pulley drive 44 from the motor 22.

Figure 6:
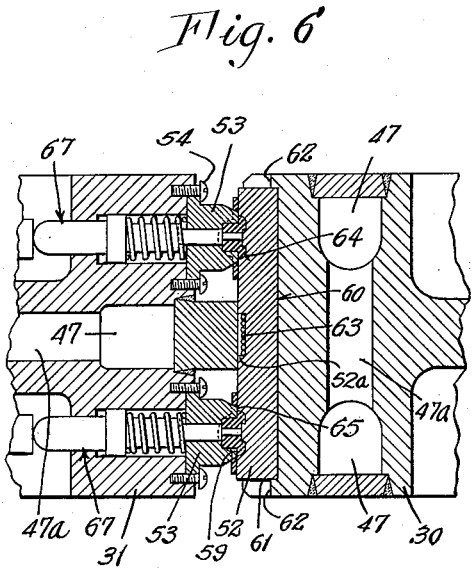
Fig. 6 is a sectional view of the elements shown in Fig. 5.

The spur gear 39 meshes with an idler gear 39a driven by the gear 39, so that the drums 30 and 31 and the rolls 34 and 35 of the warming mill 33 rotate in synchronism, and the ratio of the gearing is such that the peripheral speeds of the drums 30 and 31 and roll 34 are the same. The rolls 34 and 35 may be heated or cooled by passing steam or cooling fluid through shafts 36 and 37 which are hollow for this purpose, these shafts being connected by suitable fittings to supply pipes 45 and 46. Also, the peripheries of the drums 30 and 31, Figs. 4 and 6 have annular channels 47 and interconnecting passages 47a so that heating or cooling fluids may be fed thereto from pipes 48 connected with the the shafts 26 and 27, which latter are bored and coupled by suitable fittings with supply pipes 49.

According to the present invention, the material which is to be molded into the desired articles is deposited in the trough formed between the rolls 34 and 35 of the warming mill, and a sufficient quantity 50 of the moldable material which, for instance, may be of uncured rubber or elastomer, or other thermoplastic material, is kept in the mill so that it may be worked and heated to the desired degree of plasticity.

In the illustrated embodiment, the plasticizing mill is so arranged and the operation so conducted that a plurality of separate preformed strips can be withdrawn from the mill rolls without having the material in the mill tend to accumulate at and be drawn off principally in one strip to the detriment of the other strip or strips. When, for example, it is desired to form two strips of moldable material, the raw material 50 is supplied to the mill in separate batches at each end of the rolls 34 and 35, the material in each batch moving gradually to a separate delivery zone, which is illustrated as substantially midway of the length of the rolls, by which time it is of the desired plasticity for molding. The rolls 34 and 35 are so spaced that a predetermined quantity of the material builds up as a complete layer on the hotter roll 34. When the moldable material 50 has been brought to the desired degree of plasticity, separate continuous strips 51 thereof are peeled or stripped from the roll 34 and ultimately fed between the separate sets of dies on the drums 30 and 31. As shown, each strip 51 is first passed over a roll 51a which is power driven and aids in drawing the strip of moldable plastic material from the roll 34. Each strip 51 is cut from a separate layer of material on the roll 34 by a pair of knives 51b engaging the roll 34 and carried by a cross bar 51c, and these knives may be secured to the bar at different locations so that the space between them, and therefore the width of the strip 51, may be varied.

It will be apparent that the invention is not limited to the removal of any specific number of strips 51. Inasmuch as the dual mechanisms illustrated in connection with forming and molding the separate strips are alike, one only need be described.

Preferably, the strip 51 is cut from the material on the roll 34 near the center of the roll, and the quantity of new material which is added from time to time is fed to the milling rolls at both ends thereof so that as the material is worked, it moves across from the intake ends of the rolls to the delivery zone near the center of the mill from which the strip 51 is cut.

Figure 8:
Fig. 8 is a view showing one type of molded article made on the present machine.
Figure 5:
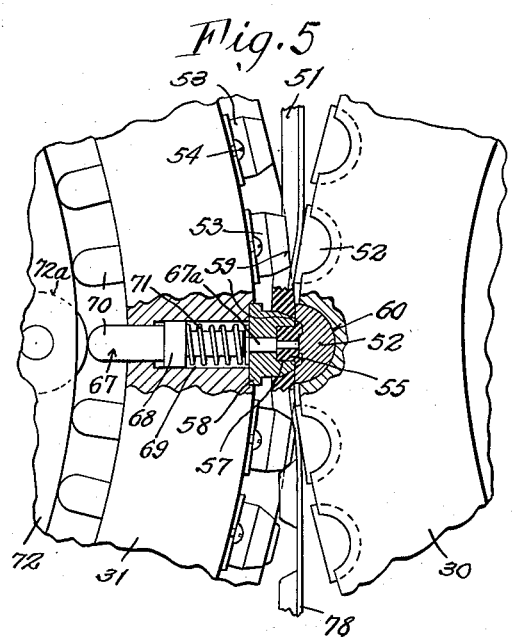
Fig. 5 is an elevation, partly in section, of the molding drums showing the molding operation.
Figure 7:
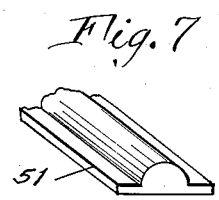
Fig. 7 is a perspective view of the preformed strip from which the molded articles are formed.

In the present invention, the strip 51 is preformed before it is fed to the molding dies to assist in and improve the molding operation. As illustrated, the mechanism for providing a preformed strip includes shaping the mill roll from which the strip is cut adjacent the cutting knives. For example, in molding buttons having the shape generally shown in Fig. 8, a preformed strip having substantially the cross-section shown in Fig. 7, is formed by providing the roll 34 with a circumferential groove 51d located midway between a pair of knives 51b. This feature of the invention relating to the cutting and removing of a continuous plasticized strip from a portion of the layer including the portion of greater thickness formed by the circumferential groove is described and claimed in my copending application, Serial No. 96,965, filed June 3, 1949.

The uneven edges of the layer of material at the ends of the roll are preferably deflected toward the center of the machine, so that they may comingle with the quantity of material 50 at the intake ends of the rolls, and be used subsequently as part of the continuous strip 51. This is accomplished by the provision of cam surfaces 51e on the plates 51f which close the ends of the trough between the rolls.

After the strip 51 leaves the roll 51a it passes downwardly, through a guide 51g, if desired, to a point immediately above the bite of the drums 30 and 31 and substantially tangentially to both drums.

The peripheries of the drums 30 and 31 are provided with sets of die elements 52 and 53 respectively, which are adapted to sequentially cooperate at the point of adjacency of molding station 32 of the drums as the latter rotate, for the purpose of blanking and molding the material of the continuous strip 51. The die elements 52 and 53 are shaped to cut predetermined blanks from the strip 51 and, if desired, to simultaneously mold said blanks to the desired shape, for instance, the buttons 55 shown in Fig. 8 without excess material being left over from the blanks. The die elements 53 may be rigidly secured to the periphery of the drum 31 by screws 54, and may be mounted in multiple groups around the drum 31, one group for each strip 51. Each element 53 has a centrally bored body and concave molding surfaces 57 and flanges 58 for engagement with the heads of the screws 54. The elements 53 may also have circular cutting or blanking edges 59 bordering the molding surfaces 57, the edges being preferably slightly flat.

The die elements 52 carried by the drum 39 are preferably mounted so as to be tiltable slightly on axes parallel to the axes of the drums to enable them to become parallel with the elements 53 for coaction just prior, upon and subsequent to the elements reaching the molding station.

Hence, the periphery of the drum 30 is provided with a plurality of transversely extending semi-cylindrical grooves 60 and the back 61 of each of the die elements 52 is semi-cylindrical in shape to nest within and rotate on the surface of a groove 60. The grooves 60 have shoulders 62 at their ends for engaging the end of the elements 52 to prevent endwise movement thereof. The die elements 52 are retained on the periphery of the drum 30 by means of a wire or strap 63 wrapped around the drum and located in a groove 52a in each element 52.

The grooves 52a are slightly rounded transversely of the die elements 52 so that the latter are free to rock, but cannot move bodily out of the cylindrical sockets 60.

Each of the die elements 52 has a pair of recesses or cavities 64 adapted to align and cooperate with the cavities or molding surfaces 57 of the pairs of die elements 53. As shown the recesses 64 are of smaller diameter than the die elements 53, and therefor the outer flat surfaces 65 of the elements 52 may engage and cooperate with the blunt cutting edges 59 of the elements 53, for the purpose of cutting or squeezing blanks from the strip of material 51 being molded.

For the purpose of molding articles with central recesses or apertures such as the buttons 55, the die elements 53 are provided with core pins in the form of plungers 67 having shanks 67a extending through central apertures in the elements, the shanks having a diameter and shoulder at their ends to produce the desired cavity in the button 55. The pins 67 have collars 68 which are slidably carried in radial bores 69 provided in the drum, and secured to the bodies 68 are inwardly directed shanks 70 which project through and beyond the inner periphery of the drum 31. The pins 67 are urged to retracted positions by springs 71 located between the collars 68 and the undersurfaces of the die elements 53.

The core pins 67 are atomatically caused to move outwardly and return as they approach and leave the molding station 32, and again project for the purpose of ejecting the molded buttons 55 by a cam mechanism 72 located within the drum 31 and in a position to be engaged by the inner ends 70 of the core pins. The cam 72 normally has a circular or concentric portion 74 holding the pins partially projected and motionless. When each pin and its accompanying due element 53 reach the molding station 32 the pin is engaged by a roller 72a which projects the pin to its full extent, and causes the outer extremity to engage the bottom of the cavity of an aligned die element 52. As each core pin 67 leaves the molding station 32 it again recedes slightly, and this causes it to be partially stripped from the material which has been molded around it to form the article or product. As the drum 31 continues and the pin progresses, the latter rides up an incline 72b which partially projects the pin again to loosen the molded article from the cavity of the die element 53. When the pin progresses still further, it again recedes due to the declining cam surface 75, and this again loosens the pin from the material which is molded around it. Finally the pin rides up an incline 76 and is again projected to a point where the molded piece is forced from the die cavity and falls onto any collecting surface. The pin now remains on the concentric portion 74 of the cam 72 until it again reaches the molding station 72.

By preforming the strip 51 to provide it with a cross-sectional configuration which approximates somewhat that of the mold cavity, the material of the strip more readily adapts itself to and fills all parts and interstices of the cavities formed between aligned die elements 52, 53 when the core pins 67 are advanced into the said cavities. In this way, the blanks of plasticized material are molded to substantially the exact shape of such cavities, the operation being facilitated by the heat of the die elements, received by conduction from the peripheries of the drums 30 and 31.

Since one of the drums is maintained at a higher temperature than the other, the drum 31 being the hotter as shown, the molded pieces 55 remain in the die elements 53 after the cooperating elements separate upon leaving the molding station 32. This differential heating or cooling of the drums may be accomplished in any suitable manner, as for instance by regulating a throttling valve 77 in the supply line 49 for the drum 30.

In order to facilitate the flow of the material over the surfaces of the die elements in filling the cavities thereof and to keep the molded pieces 55 from becoming so adhering to the die elements 53 and core pins 67 that they could not be readily removed, and also to avoid the sticking of the pieces to the die elements 52, both sets of die elements are moistened with a suitable molding lubricant escaping slowly through nozzles 101, as they approach the molding station 32.

Due to the projected portions of the core pins located in the die elements 53, the molded pieces 55 are temporarily retained in the elements only until the pins are retracted and again projected, for as soon as each core pin is retracted from its molded piece, the cavity thereof contracts and upon the next outward movement of the pin an outward impetus is given to the molded piece which causes it to be dislodged from the die 53 and ejected.

According to the present invention in its form at present preferred, when the moldable material is of a curable nature, such as synthetic rubber, the process is so carried out that no curing of the molded piece is effected while it remains in the die. Rather, the molded pieces are ejected from the die elements as above explained, and then subsequently vulcanized or cured. In this way the operation of molding or forming is not retarded by the necessarily longer operation of curing, and according to the broader aspects of this invention, this curing may be accomplished in any suitable way or at any place.

As pointed out in my said co-pending application, loss of material which would otherwise be scrap is virtually eliminated by returning the skeletonized portion 78 of the continuous strip 51 back to the warming mill in virtually the uncured condition it was in when it left the mill, and the arrangement is such that each blanked out strip is fed into the mill at an intake end thereof and comingles with the material being milled and being supplied as replenishment. This may be accomplished in any suitable way, but as illustrated herein each blanked out strip 78 passes over an idler roller 79b and another idler roller 79c whereby the strip is kept from contact with the drum 30, then over a transversely disposed idler roller 79d and thence over a power driven pull roller 79 with which it is kept engaged by a pressure roller 79e. From the pull roller 79 each skeletonized strip 78 is led into the mass of material 50 at the adjacent intake end of the milling rollers.

It will be understood of course that as the drums 30 and 31 revolve and the pieces 55 are formed, the blanked out strip 78 is carried back into the mill continuously and is again plasticized in the mill and used for product.

In the present invention, the composition from which the articles are molded is so constituted that the proper accelerator is employed considering the kind of work to be done, the condition of heat and speed of the machine, and the time which may be conveniently allowed for curing and vulcanizing the blanked-out piece. Preferably, the accelerator selected is such that the strip of plasticized material which extends from the warming mill to the molding position and then back to the warming mill is not appreciably changed, that is to say, is not cured. Where slow machine speeds are used, a composition having a slower accelerator may be employed, and of course, the greater the speed of the machine the faster the accelerator which may be used.

It will be apparent that the invention can be employed in producing and molding articles from a single preformed strip or form a plurality of such strips. In the latter case, a separate batch of raw material for producing each strip is maintained in the mill and fed to a separate preforming and strip take-off point so that each strip receives its full quota of plasticized material. The strips are formed and the articles are molded automatically and continuously as long as raw material is periodically supplied to the mill rolls.

Variations and modifications may be made within the scope of this invention and portions of the improvements may be used without others.

I claim:

1. The method which comprises the steps of milling between mill rollers a quantity of moldable material until one of the mill rollers has an enveloping surface layer of plasticized material of the desired degree of plasticity and of predetermined thickness; cutting and removing from two adjacent parts of the central portion of the layer two continuous plasticized strips leaving gaps in the layer; and building banks on the mill rollers by continually supplying additional and replenishing material between the location of each gap and the adjacent end of the mill rollers to maintain the banks in sufficient volume to cause the material to creep toward the center portions of the mill roller and fill the gaps in the enveloping layer as the latter passes through the nip of the rollers.

2. The method which comprises the steps of milling between mill rollers a quantity of moldable material until one of the mill rollers has an enveloping surface layer of plasticized material of the desired degree of plasticity and of predetermined thickness; cutting and removing from two adjacent parts of the central portion of the layer two continuous plasticized strips leaving gaps in the layer; removing pieces from said strips while leaving the strips continuous but skeletonized; and continuously feeding said skeletonized strips respectively back to the mill rollers to form banks thereon between the location of each gap and the adjacent end of the mill rollers, and there continually adding replenishing material which, with said skeletonized strip, commingles with and maintains said banks in sufficient volume to cause the material to creep toward the center portions of the mill roller and fill the gaps in the enveloping layer as the latter passes through the nip of the rollers.

3. The method which comprises the steps of milling between mill rollers a quantity of moldable material until one of the mill rollers has an enveloping surface layer of plasticized material of the desired degree of plasticity and of predetermined substantially uniform thickness except for two centrally located thicker portions; cutting and removing from two adjacent portions of the layer containing said thicker portions two continuous plasticized strips leaving gaps in the layer; removing pieces from said strips while leaving the strips continuous and skeletonized; and continuously feeding said skeletonized strips respectively back to the mill rollers to form banks thereon between the location of each gap and the adjacent end of the mill rollers, and there continually adding replenishing material which, with said skeletonized strip, commingles with and maintains said banks in sufficient volume to cause the material to creep toward the center portions of the mill roller and fill the gaps in the enveloping layer as the latter passes through the nip of the rollers.

4. A machine for continuously molding articles comprising plasticizing mill rollers; means at the end sections of said mill rollers to deflect inwardly separate banks of moldable material to form an enveloping surface layer of plasticized material of the desired degree of plasticity and of predetermined thickness on one of said mill rollers; means adjacent the central section of said mill rollers to separate a plurality of continuous strips from the surface layer of plasticized material; means to guide said strips individually to a plurality of pairs of molding dies; means to form separate molded articles from the central portions of each of said strips, while leaving the strips continuous but skeletonized; means to separate said molded articles from said skeletonized strips; and guide means adjacent the end sections of the mill rollers to return said skeletonized strips individually to the mill rollers to be commingled with replenishing material added thereat to maintain the separate banks of moldable material being deflected and worked inwardly to the central section of the mill rollers.

5. A machine for continuously forming articles comprising plasticizing mill rollers; means at the end sections of said mill rollers to deflect inwardly a quantity of moldable material to form an enveloping surface layer of plasticized material of the desired degree of plasticity and of predetermined thickness on one of said mill rollers; means adjacent the central section of said mill rollers to separate from the layer two continuous strips of plasticized material slightly wider than the article to be formed, thus creating two gaps in the surface layer; means to guide said strips individually to a plurality of pairs of forming dies; means to form and remove separate articles from the central portions of each of said strips, while leaving the strips continuous but skeletonized; and guide means adjacent the end sections of the mill rollers to return said skeletonized strips individually to the end sections of the mill rollers to be commingled with replenishing material added thereat to maintain the separate banks being deflected and worked inwardly to the central section of the mill rollers to fill the gaps removed from the surface layer.

6. A machine for continuously forming articles comprising plasticizing mill rollers; means at the end sections of said mill rollers to deflect inwardly separate banks of moldable material to form an enveloping surface layer of plasticized material of the desired degree of plasticity on one of the mill rollers; spaced circumferential grooves on the central section of at least one of said mill rollers to form portions in said layer of greater thickness; means adjacent the central section of the mill rollers to separate a plurality of continuous strips from the layer of plasticized material, said strips including the portions of greater thickness; means to guide said strips individually to a plurality of pairs of forming dies; means to form and remove separate articles from the central portions of each of said strips while leaving the strip continuous but skeletonized; and guide means adjacent the end sections of the mill rollers to return said skeletonized strips individually to the separate banks at the end sections of the mill rollers to be commingled with replenishing material added thereat to be deflected and worked therewith inwardly to the central section of the mill rollers.

HENRY Z. GORA.

REFERENCES CITED

The following references are of record in the file of this patent:

UNITED STATES PATENTS

| Number | Name | Date |
|---|---|---|
| 1,544,305 | Fisher | June 30, 1925 |
| 1,619,210 | MacLaren | Mar. 1, 1927 |
| 1,680,171 | Hollenbeck | Aug. 7, 1928 |
| 1,750,708 | Edwards | Mar. 18, 1930 |
| 1,944,464 | Richardson | Jan. 23, 1934 |
| 2,063,019 | Bardach et al. | Dec. 8, 1936 |
| 2,218,527 | De Wyk et al. | Oct. 22, 1940 |
| 2,319,040 | Conklin | May 11, 1943 |
| 2,456,697 | Gruenwald | Dec. 21, 1948 |